Patented Oct. 16, 1928.

1,687,596

UNITED STATES PATENT OFFICE.

OSKAR SPENGLER, OF DESSAU IN ANHALT, AND WERNER MÜLLER, OF LEIPZIG, GERMANY, ASSIGNORS TO GRASSELLI DYESTUFF CORPORATION, OF NEW YORK, N. Y., A CORPORATION OF DELAWARE.

MANUFACTURE OF AROMATIC AMINO SULPHOCYANO DERIVATIVES.

No Drawing. Original application filed September 2, 1925, Serial No 54,131, and in Germany September 24, 1924. Divided and this application filed April 28, 1926. Serial No 105,260.

In an application Ser. No. 54,131, filed Sept. 2, 1925, and granted as U. S. Patent 1,594,697, we claim the manufacture of sulphocyano derivatives by causing a solution containing a product of the reaction between a halide of sulphuric acid and a sulphocyanide to react with a hydroxyaryl compound.

Now in the present invention which is a division of the above mentioned application we claim the manufacture of sulphocyano derivatives by causing a solution containing a product of the reaction between a halide of sulphuric acid and a sulphocyanide to react with an aminoaryl compound. The reaction in a suitable solvent between a halide of sulphuric acid and a sulphocyanide, for example, lead sulphocyanide, produces a solution containing a compound which easily decomposes into thiocyanogen and sulphurous acid. One can assume the production of a sulphuryl sulphocyanide as an intermediate stage in the reaction between a sulphocyanide and a sulphochloride for example.

The following example illustrates the invention, the parts being by weight:

13.5 parts of sulphurylchloride are dissolved in 400 parts of carbon tetrachloride and an excess of finely powdered lead sulphocyanide is introduced. A lively reaction sets in at once and after some time the reaction is completed. The lead chloride and excess of sulphocyanide are separated by filtration and the filtrate mixed with a cold solution of 8.5 parts of diphenylamine in chloroform. Hydrogen sulphocyanide is rapidly evolved and the solution becomes turbid, a brown oil separating from it; this oil becomes crystalline when rubbed with a glass rod. On recrystallization there is obtained the 4.4'-disulphocyano diphenylamine of melting point 120° C.

It is obvious to those skilled in the art that our present invention is not limited to the foregoing example or to the details given therein. It may be stated for instance that instead of the diphenylamine employed in the foregoing example any aminoaryl compound may be used. It is obvious that in employing such other aminoaryl compound the proportions of the ingredients as well as the other special conditions of reaction may be altered in order to obtain the best results.

Having now described our invention and the manner in which it may be carried out what we claim is,—

The herein described manufacture of sulphocyano derivatives by causing a solution containing a product of the reaction between a halide of sulphuric acid and a sulphocyanide to react with aromatic amino compounds.

In testimony whereof we affix our signatures.

OSKAR SPENGLER.
WERNER MÜLLER.